(12) United States Patent
Yamasaki et al.

(10) Patent No.: US 7,713,410 B2
(45) Date of Patent: May 11, 2010

(54) WASTEWATER TREATMENT APPARATUS

(75) Inventors: Kazuyuki Yamasaki, Hiroshima (JP); Kazuyuki Sakata, Fukuyama (JP)

(73) Assignee: Sharp Kabuhsiki Kaisha, Osaka (JP)

( * ) Notice: Subject to any disclaimer, the term of this patent is extended or adjusted under 35 U.S.C. 154(b) by 718 days.

(21) Appl. No.: 11/519,217

(22) Filed: Sep. 12, 2006

(65) Prior Publication Data
US 2007/0138091 A1    Jun. 21, 2007

(30) Foreign Application Priority Data
Dec. 20, 2005    (JP) .............................. 2005-366696

(51) Int. Cl.
*C02F 3/00*    (2006.01)
(52) U.S. Cl. .................... 210/150; 210/151; 210/195.1; 210/196; 210/916
(58) Field of Classification Search ......... 210/150–151, 210/195.1, 196, 916
See application file for complete search history.

(56) References Cited

U.S. PATENT DOCUMENTS

| | | | | |
|---|---|---|---|---|
| 3,855,121 A | * | 12/1974 | Gough | 210/610 |
| 4,302,236 A | * | 11/1981 | Roman | 71/9 |
| 5,676,836 A | * | 10/1997 | Yamasaki et al. | 210/602 |
| 5,702,604 A | | 12/1997 | Yamasaki et al. | |
| 6,328,899 B1 | | 12/2001 | Chifuku et al. | |

FOREIGN PATENT DOCUMENTS

| | | |
|---|---|---|
| JP | 6-91289 A | 4/1994 |
| JP | 9-70599 A | 3/1997 |
| JP | 3095620 | 8/2000 |
| JP | 2000-279970 A | 10/2000 |
| JP | 3467671 | 9/2003 |
| JP | 2003-334548 | 11/2003 |
| JP | 2004-121962 | 4/2004 |
| JP | 2004-321959 | 11/2004 |

* cited by examiner

*Primary Examiner*—Chester T Barry
(74) *Attorney, Agent, or Firm*—Nixon & Vanderhye P.C.

(57) ABSTRACT

In a waste water treatment apparatus and/or method, waste water containing aminoethanol and dimethyl sulfoxide is introduced into a first denitrification tank within a first waste water treatment apparatus. Malodorous gas generated in the first waste water treatment apparatus is decomposed and treated in a second waste water treatment apparatus where another waste water is treated as another system. The second waste water treatment apparatus has a second nitrification tank including a semi-anaerobic section. The malodorous gas is introduced from the first waste water treatment apparatus into a scrubber. The malodorous gas is treated by sludge which is circulated between the second nitrification tank and the scrubber.

11 Claims, 4 Drawing Sheets

DIMETHYL SULFOXIDE CONCENTRATION : 80 ppm
NITROGEN CONCENTRATION : 3000 ppm

| TANK NAME | RESIDENCE TIME | TIMING (DAY) 1  2  3  4  5  6 |
|---|---|---|
| FIRST DENITRIFICATION TANK | 1 DAY | —— |
| FIRST NITRIFICATION TANK | 2 DAYS | ———— |
| SECOND DENITRIFICATION TANK | 1 DAY | ——  |
| SECOND NITRIFICATION TANK | 2 DAYS | ———— |

Fig.4B

DIMETHYL SULFOXIDE CONCENTRATION : 160 ppm
NITROGEN CONCENTRATION : 3000 ppm

| TANK NAME | RESIDENCE TIME | TIMING (DAY) 2  4  6  8  10  12 |
|---|---|---|
| FIRST DENITRIFICATION TANK | 2 DAYS | —— |
| FIRST NITRIFICATION TANK | 4 DAYS | ———— |
| SECOND DENITRIFICATION TANK | 2 DAYS | —— |
| SECOND NITRIFICATION TANK | 4 DAYS | ———— |

WASTEWATER TREATMENT APPARATUS

CROSS-REFERENCE TO RELATED APPLICATIONS

This nonprovisional application claims priority under 35 U.S.C. §119(a) on Patent Application No. 2005-366696 filed in Japan on 20 Dec. 2005, the entire contents of which are incorporated herein by reference.

BACKGROUND OF THE INVENTION

The present invention relates to a waste water treatment method and a waste water treatment apparatus. The present invention relates to, as an example, a waste water treatment method and a waste water treatment apparatus in compliance with the total volume control of nitrogen in conformity to partial amendments to Water Pollution Control Law implemented as of April 2004 and in compliance with the emission reduction of toxic substances in conformity to PRTR (Pollutant Release and Transfer Register) Law implemented as of April 2001. The present invention relates to, for example, a waste water treatment method and a waste water treatment apparatus for treating two types of waste water, that is, waste water containing aminoethanol and dimethyl sulfoxide and waste water containing high concentration nitrogen (such as high concentration ammonium waste water, waste developer and dimethylformamide waste liquid) discharged mainly from semiconductor plants. Aminoethanol is designated as one of first-class designated chemicals in PRTR Law. The present invention also relates to, as an example, a waste water treatment apparatus and a waste water treatment method which can implement malodor treatment and microbial treatment without dilution, and therefore are excellent in initial costs, running costs and maintenance costs.

Conventionally, it has generally been regarded as impossible to apply microbial treatment to waste water which contains dimethyl sulfoxide and aminoethanol in a highly-concentrated form, specifically at about 3000 ppm for example, due to high microbial toxicity of aminoethanol.

In the case where microbial treatment has been applied to the waste water containing both aminoethanol and dimethyl sulfoxide, the microbial treatment has generally been applied thereto with the concentrations of aminoethanol and dimethyl sulfoxide are respectively as low as several hundred ppm.

Accordingly, the waste water containing high concentration aminoethanol and/or dimethyl sulfoxide at as high as 3000 ppm or more has been concentrated to about 1/10 with use of an evaporator as a physical method. Resultant concentrated solution has been disposed as industrial waste.

That is to say, the waste water is concentrated by using the evaporator and discharged as industrial waste from plants. In this way, the concentrated solution is deemed as industrial waste, and therefore, quantity of industrial waste from the plants is increased. In the disposal way of the concentrated solution as industrial waste, the concentrated solution has generally been disposed by incineration. Therefore, there have been problems such as air pollution because heavy oil or the like is used as fuel. Moreover, the treatment using the evaporator consumes a large amount of energy and involves large plant equipment, which leads to large initial, running and maintenance costs.

A biological treatment method is disclosed as a conventional art by JP 3467671. This biological treatment method is a nitrification and denitrification method wherein organic waste water in a raw water tank is fed to a denitrification tank and a nitrification tank sequentially by using liquid supply pumps while being circulated between both the tanks. Thereby, ammonia nitrogen contained in the organic waste water is reduced to nitrogen gas by biological nitrification and denitrification actions to be removed. Further, sludge and treated water are separated by means of a filtration membrane unit immersed in the waste water in the nitrification tank with use of a suction pump.

The feature of the nitrification and denitrification method is that part of organic waste water fed from the denitrification tank to the nitrification tank is ejected to the organic waste water in the denitrification tank, wherein a conduit pipe from the denitrification tank to the nitrification tank diverge in some midpoint, and an end of a diverged pipe is opened to the denitrification tank.

Another biological treatment method is disclosed in JP 3095620 as another conventional art. In this biological treatment method, a biological nitrogen removing apparatus is used. The biological nitrogen removing apparatus has a denitrification tank for receiving inflow of raw water containing organic substances, a nitrification tank for receiving inflow of denitrification tank mixtures from the denitrification tank, a nitrified liquid circulation channel for circulating nitrified liquid of the nitrification tank to the denitrification tank, and a nitrification tank diffuser placed inside the nitrification tank.

Specifically, the biological nitrogen removing apparatus has a denitrification tank, which is provided with a zone filled with denitrifying bacteria-immobilizing carriers, so as to catch and remove suspended solids in the raw water flowing into the denitrification tank. A raw water introduction channel and a nitrified liquid circulation channel are linked to a lower position of the zone filled with the denitrifying bacteria-immobilizing carriers in the denitrification tank. A sludge hopper section is provided on the bottom section of the denitrification tank so as to accumulate and remove the suspended solids caught in the zone filled with the denitrifying bacteria-immobilizing carriers. The sludge hopper section is provided with a hopper diffuser.

However, as stated above, microbial treatment has not conventionally been applied to the waste water containing high concentration aminoethanol and dimethyl sulfoxide at about 3000 ppm, in general, due to high biological toxicity. Therefore, the above-stated concentration method have been used for treating the waste water containing high concentration aminoethanol and dimethyl sulfoxide which cannot undergo microbial treatment due to high biological toxicity.

However, the concentration method has such problems as increase in energy consumption and increase in industrial waste as concentrated solution.

On the other hand, it has been demanded to efficiently treat malodor including sulfur generated during waste water treatment while reducing initial costs, running costs and maintenance costs.

SUMMARY OF THE INVENTION

An object of the present invention is to provide a waste water treatment apparatus and a waste water treatment method which are capable of efficiently treating water to be treated and malodorous gas as well as reducing initial and running costs.

In order to achieve the object, the present invention provides a waste water treatment method, comprising the steps of:

bringing malodorous gas and sludge into contact with each other; and introducing the sludge which has brought into contact with the malodorous gas and treatment water into a high concentration microbial tank in which a microbial concentration is 10000 ppm or more.

According to the waste water treatment method of the present invention, the sludge gas contacts with the malodorous gas so that the sludge absorbs the malodorous gas. The sludge containing malodorous components of the malodorous gas is then introduced into the high concentration microbial tank where a microbial concentration is 10000 ppm or more. Thereby it becomes possible to simultaneously treat the malodorous components of the malodorous gas and the target components of the treatment water. Therefore, according to the waste water treatment method of the present invention, the waste water treatment apparatus can also be used as malodor removal equipment. Further, the sludge which is generated during waste water treatment is used for treating malodorous gas, instead of chemicals. According to the present invention, therefore, it becomes possible not only to efficiently treat the treatment water and the malodorous gas but also to reduce initial and running costs. As used herein, the treatment water is defined as water to be treated or treatment-receiving water.

The present invention also provides a waste water treatment apparatus, comprising:
- a contact section for receiving malodorous gas and sludge and brining the malodorous gas and the sludge into contact with each other; and
- a high concentration microbial tank for receiving the sludge which has brought into contact with the malodorous gas and treatment water and having a microbial concentration of 10000 ppm or more.

According to the waste water treatment apparatus in the present embodiment, the malodorous components of the malodorous gas are absorbed into the sludge by contacting the malodorous gas with the sludge in the contact section. Then, the sludge containing the malodorous components and the treatment water are introduced into the high concentration microbial tank where a microbial concentration is 10000 ppm or more. Thereby it becomes possible to simultaneously treat the malodorous components of the malodorous gas and the treatment target components of the treatment water. Therefore, according to the waste water treatment apparatus of the present invention, the waste water treatment apparatus can also be used as malodor removal equipment. Further, the sludge which is generated in waste water treatment is used for treating malodorous gas, instead of the chemicals. According to the present invention, therefore, it becomes possible to efficiently treat the treatment water and the malodorous gas as well as to reduce initial and running costs.

In one embodiment of the present invention, the contact section is a scrubber.

According to the waste water treatment apparatus in the present embodiment, the scrubber is used as the contact section. Thereby, the malodorous gas can be treated more efficiently when the sludge and the malodorous gas are brought into contact with each other.

In one embodiment of the present invention, the malodorous gas contains sulfur generated during biological treatment of waste water containing aminoethanol and dimethyl sulfoxide.

According to the waste water treatment method in the present embodiment, the malodorous gas containing sulfur, which is generally difficult to treat, is treated at low cost. This is because the malodorous gas contains sulfur generated during denitrification of the waste water containing aminoethanol and dimethyl sulfoxide is brought into contact with sludge, then the malodorous gas is treated in the high concentration microbial tank.

In one embodiment of the present invention, the high concentration microbial tank has a polyvinylidene chloride filler material.

According to the present embodiment, the polyvinylidene chloride filler material in the high concentration microbial tank stabilizes microorganisms and makes it possible to simultaneously treat the malodorous components of malodorous gas contained in the sludge and the treatment target components in the treatment water with efficiency.

In one embodiment of the present invention, the high concentration microbial tank has a submerged membrane.

According to the waste water treatment apparatus in the present embodiment, the submerged membrane in the high concentration microbial tank eliminates a bulking phenomenon or the like which is peculiar to the microbial treatment, so that solid-liquid separation is ensured in the high concentration microbial tank. Moreover, the sludge concentrated with use of the submerged membrane has very high capability to adsorb malodor.

In one embodiment of the present invention, the high concentration microbial tank has a lower semi-anaerobic section and an upper aerobic section.

According to the waste water treatment apparatus in the present embodiment, the high concentration microbial tank has the lower semi-anaerobic section and the upper aerobic section, so that the varieties of microorganisms propagating in the high concentration microbial tank increase. Thereby it becomes possible to achieve efficient treatment of treatment water and malodor.

In one embodiment of the present invention, the waste water treatment apparatus further comprises a denitrification and nitrification section for denitrifying and nitrifying nitrogen waste water, wherein the high concentration microbial tank is a nitrification tank included in the denitrification and nitrification section.

According to the waste water treatment apparatus in the present embodiment, the nitrification tank included in the denitrification and nitrification section allows both the treatment of nitrogen waste water and the treatment of malodorous gas. Therefore it becomes possible to reduce construction costs (initial costs).

In one embodiment of the present invention, the denitrification and nitrification section has:
- a denitrification tank;
- the nitrification tank; and
- an air-lift pump for circulating treatment water from the nitrification tank to the denitrification tank.

According to the waste water treatment apparatus in the present embodiment, circulating the treatment water between the denitrification tank and the nitrification tank allows efficient treatment of nitrogen waste water, while using an air-lift pump for the circulation allows reduction in electric power for the circulation.

In one embodiment of the present invention, treated water which has biologically been treated and/or sludge generated during biological treatment are introduced into the denitrification and nitrification section.

According to the waste water treatment apparatus in the present embodiment, the biologically treated water and/or the sludge generated during biological treatment enable the denitrification and nitrification section to be replenished with various minerals necessary for microorganisms. This activates the microorganisms in the denitrification and nitrification section and stables denitrification and nitrification treatment.

The present invention provides a waste water treatment apparatus, comprising:
a first waste water treatment section for performing first waste water treatment and generating malodorous gas; and
a second waste water treatment section for performing second waste water treatment and decomposing and treating the malodorous gas generated by the first waste water treatment section,
the first waste water treatment section having:
a first denitrification tank for receiving waste water containing aminoethanol and dimethyl sulfoxide; and
a first nitrification tank having a semi-anaerobic section, and
the second waste water treatment section having:
a second denitrification tank for receiving nitrogen waste water;
a second nitrification tank having a semi-anaerobic section;
a scrubber for receiving malodorous gas from the first waste water treatment section;
a first sludge introduction section for introducing sludge from the second nitrification tank into the scrubber; and
a second sludge introduction section for introducing the sludge from the scrubber into the second nitrification tank.

According to the waste water treatment apparatus in the present embodiment, the waste water containing aminoethanol and dimethyl sulfoxide is introduced into the first denitrification tank of the first waste water treatment section. The malodorous gas generated in the first waste water treatment section is decomposed and treated in the second waste water treatment section. In the second waste water treatment section as another system, waste water treatment different from that in the first waste water treatment section is performed. The second waste water treatment section, in which the malodorous gas is decomposed and treated, has a second nitrification tank including a semi-anaerobic section. The malodorous gas, which is introduced from the first waste water treatment section into the scrubber, is treated by the sludge circulating between the second nitrification tank and the scrubber.

According to the embodiment, therefore, the waste water containing aminoethanol and dimethyl sulfoxide is treated in the first waste water treatment section. The high-concentration nitrogen waste water is treated in the second waste water treatment section, while the malodorous gas generated in the first waste water treatment section is efficiently treated in the second waste water treatment section.

In one embodiment of the present invention, the malodorous gas contains volatile organic compounds.

According to the waste water treatment method in the present embodiment, the sludge containing volatile organic compounds contained in malodorous gas is introduced into the high concentration microbial tank, where the volatile organic compounds contained in malodorous gas is biologically treated.

In one embodiment of the present invention, the malodorous gas contains volatile organic compounds.

According to the waste water treatment apparatus in the present embodiment, the sludge containing volatile organic compounds contained in malodorous gas is introduced into the high concentration microbial tank, where the volatile organic compounds contained in malodorous gas is biologically treated.

In one embodiment of the present invention, the sludge contains micro-nano bubbles.

According to the waste water treatment method in the present embodiment, the sludge contains micro-nano bubbles, and therefore, microorganisms are activated in the high concentration microbial tank which receives the sludge. Compounds of malodorous gas can efficiently be decomposed and treated by the activated microorganisms.

In one embodiment of the present invention, the sludge contains micro-nano bubbles.

According to the waste water treatment apparatus in the present embodiment, the sludge contains micro-nano bubbles, and therefore, microorganisms are activated in the high concentration microbial tank which receives the sludge. Compounds of malodorous gas can efficiently be decomposed and treated by the activated microorganisms.

The micro-nano bubbles are defined as bubbles which contain both micro bubbles (with a diameter of 50 µm or less) and nano bubbles (with a diameter of 1 µm or less). The micro-nano bubbles are considered to have a function to increase and maintain the dissolved oxygen in water. Since nano bubbles are bubbles with a diameter of 1 µm or less, the nano bubbles are considered to have a direct action upon living organisms on a cell level and increase the activity of microorganisms in particular. Further, typical functions of the micro-nano bubbles include a surface activation action, a pollution component adsorption function, a function of high speed cleaning of object surfaces and an antiseptic function.

In one embodiment of the present invention, the volatile organic compounds contained in the malodorous gas contain at least one of isopropyl alcohol, acetone and butyl acetate.

According to the waste water treatment method in the present embodiment, the high concentration microbial tank receives the sludge containing at least one of isopropyl alcohol, acetone and butyl acetate as volatile organic compounds contained in the malodorous gas. The microorganisms in the high concentration microbial tank easily decompose and treat the isopropyl alcohol, acetone, butyl acetate.

In one embodiment of the present invention, the volatile organic compounds contained in the malodorous gas contain at least one of isopropyl alcohol, acetone and butyl acetate.

According to the waste water treatment apparatus in the present embodiment, the high concentration microbial tank receives the sludge containing at least one of isopropyl alcohol, acetone and butyl acetate as volatile organic compounds contained in the malodorous gas. The microorganisms in the high concentration microbial tank easily decompose and treat the isopropyl alcohol, acetone, butyl acetate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will hereinbelow be described in detail in conjunction with the embodiments with reference to the drawings.

First Embodiment

Figure 1:
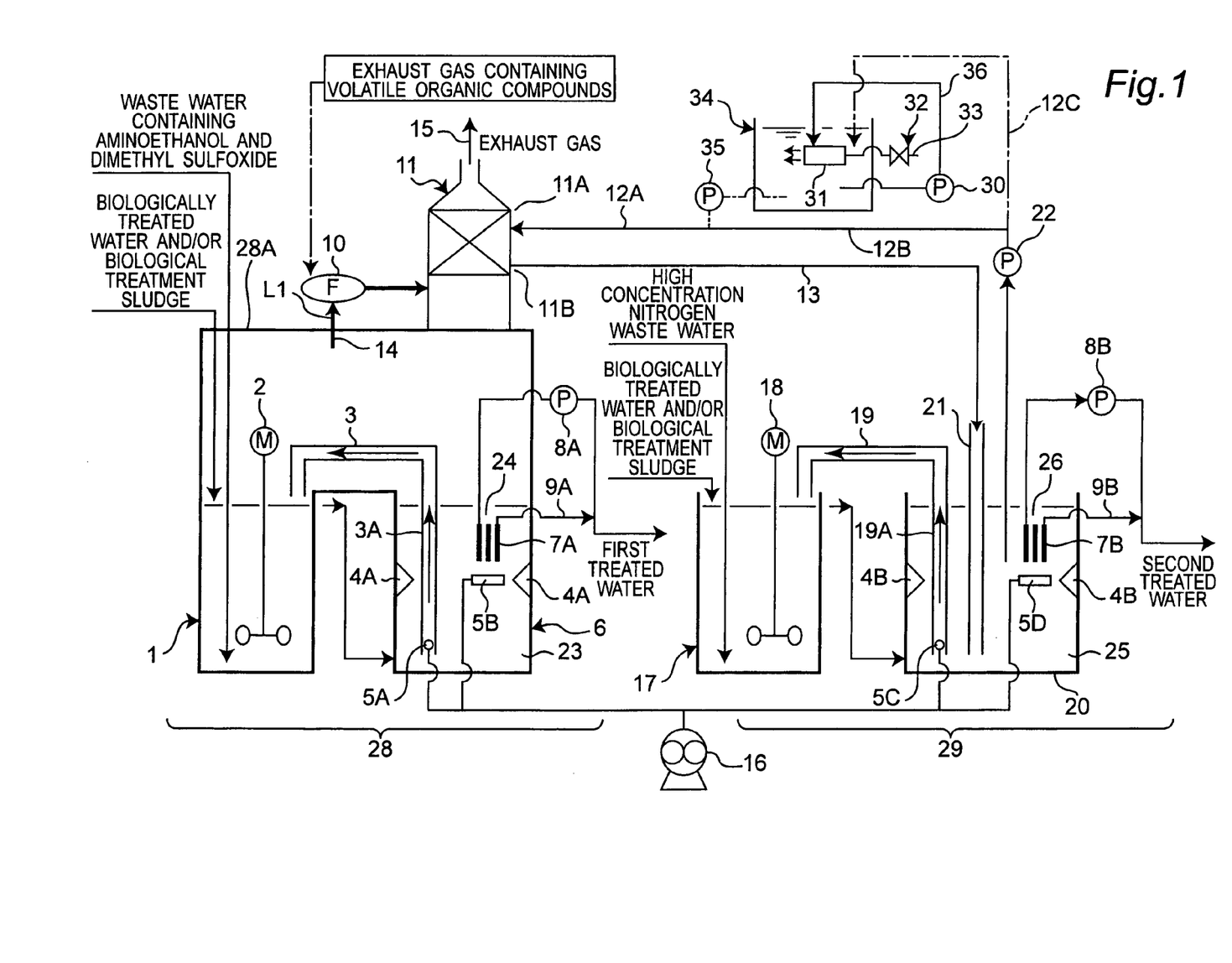
FIG. 1 is a schematic view of a waste water treatment apparatus according to a first embodiment of the present invention and modification thereof.

FIG. 1 is a schematic view of a waste water treatment apparatus according to a first embodiment of the present invention. In the first embodiment, the waste water treatment apparatus is provided with a first waste water treatment apparatus 28 serving as a first waste water treatment section and a second waste water treatment apparatus 29 serving as a second waste water treatment section. In the first waste water treatment apparatus 28, malodorous gas generates. The second waste water treatment apparatus 29 treats the malodorous gas generated in the first waste water treatment apparatus 28.

Description is first given of the first waste water treatment apparatus 28 which generates malodorous gas. The first waste water treatment apparatus 28 has a first denitrification tank 1 and a first nitrification tank 6.

Waste water containing aminoethanol and dimethyl sulfoxide is introduced into a lower portion of the first denitrification tank 1. Microbial concentration is higher in the lower portion of the first denitrification tank 1 than an upper portion thereof due to gravity. Consequently, microbial treatment is stabilized since a shock to microorganisms is reduced by introducing toxic waste water containing aminoethanol into the lower portion of the first denitrification tank 1.

Moreover, the first denitrification tank 1 receives biologically treated water and/or sludge generated in biological treatment. In the first denitrification tank 1 and the first nitrification tank 6, activity of all the microorganisms is promoted by micronutrients such as phosphorus, potassium, calcium and magnesium contained in the biologically treated water and/or the sludge generated during biological treatment. In the case where no micronutrients are contained in treatment water, microbial treatment cannot be stabilized. This is especially true in the high concentration microbial treatment where a submerged membrane 7A placed in an upper aerobic section 24 is used in the first nitrification tank 6.

Moreover, an agitator 2 is placed in the first denitrification tank 1 so as to agitate the water in the tank 1. Regarding the agitator 2, a submerged agitator may be placed in water instead of a general agitator as long as it is possible to efficiently mix anaerobic microorganisms and waste water containing aminoethanol and dimethyl sulfoxide. The microbial concentration in the first denitrification tank 1 is as high as 10000 ppm in MLSS (Mixed Liquor Suspended Solids). Therefore, there might be a dead space in the first denitrification tank 1, that is, a portion which could not be agitated by the agitator 2. To solve this problem, an air-lift pump 3 is employed for circulated agitation in the present embodiment.

Specifically, the air-lift pump 3 introduces a large amount of return sludge containing microorganisms into the upper portion of the first denitrification tank 1 from a lower semi-anaerobic section 23 of the first nitrification tank 6.

In the air-lift pump 3, a diffusing pipe 5A is provided at the lower end of a longitudinal pipe 3A. The diffusing pipe 5A is connected to a blower 16. Air generated by the blower 16 is discharged from the diffusing pipe 5A provided inside the longitudinal pipe 3A. Ascending flow of air in the longitudinal pipe 3A moves the return sludge containing microorganisms from the lower portion to the upper portion of the longitudinal pipe 3A.

Next, the waste water containing aminoethanol and dimethyl sulfoxide which has been introduced into the first denitrification tank 1 is anaerobically treated, and then introduced by gravity into the lower semi-anaerobic section 23 of the first nitrification tank 6 from the upper portion of the first denitrification tank 1.

A the submerged membrane 7A is placed in the upper aerobic section 24 of the first nitrification tank 6. Therefore, the microorganisms either stay in the first nitrification tank 6 or are returned to the first denitrification tank 1 by the air-lift pump 3. The return sludge is transferred by the air-lift pump 3 that utilizes air. Therefore, a large amount of the return sludge is transferred by small power. In other words, the transfer system by using the air-lift pump 3 is an energy saving system. Generally, the pump system using mechanical driving force, such as a squeeze pump, can secure a large pump head but requires large power in comparison with the air-lift pump system, and therefore cannot fall into the energy-saving system.

The microbial sludge returned to the first denitrification tank 1 by the air-lift pump 3 returns to the first nitrification tank 6 again for circulation. Circulating the microorganisms between both the tanks maintains the microbial concentration in both the tanks at generally the same level. As described above, circulated agitation by using the air-lift pump is a countermeasure against generation of the dead space due to high microbial concentration of 10000 ppm or more at which general agitators or submerged agitators cannot agitate. The microbial concentrations in both the first denitrification tank 1 and the first nitrification tank 6 are maintained at 10000 ppm or more in MLSS (Mixed Liquor Suspended Solid). An oxidation-reduction potentiometer (unshown) is placed in the first denitrification tank 1 to measure the level of the anaerobiotic state.

In the first denitrification tank 1, nitrite nitrogen introduced from the first nitrification tank 6 by the air-lift pump 3 is reduced to nitrogen gas by anaerobic microorganisms under the presence of aminoethanol. Aminoethanol is served as a substitute of methanol that is a general hydrogen donor. The nitrite nitrogen is produced in such a way that the aminoethanol is decomposed by microorganisms in the first nitrification tank 6. In the first denitrification tank 1, organisms other than aminoethanol are biologically decomposed for treatment by anaerobic microorganisms.

Next, treatment water flowing from the first denitrification tank 1 is introduced into the lower semi-anaerobic section 23 of the first nitrification tank 6. Herein, the anaerobic section is defined as a section in the state that no dissolved oxygen is present. T the aerobic section is defined as a section in the state that a dissolved oxygen level is maintained at several ppm. The semi-anaerobic section is defined as a section in the state that the dissolved oxygen level is more than 0 ppm up to about 0.5 ppm if any present.

The first nitrification tank 6 has a separation wall 4A placed on the inner side surface of the tank 6. The separation wall 4A is for separating the upper aerobic section 24 from the lower semi-anaerobic section 23. The separation wall 4A may be constructed with concrete or made of steel. Although the separation wall 4A may be made from any material, in the case of using steel, sufficient coating is necessary for preventing corrosion for a long period of time. A water flow is generated in the upper aerobic section 24 of the first nitrification tank 6 by air discharged from a diffusing pipe 5B. Due to the separation wall 4A, however, the water flow has some but not so much influence upon the lower semi-anaerobic section 23. Since the microbial concentration is high in the first nitrification tank 6, the water flow influence of the aerobic section 24 upon the semi-anaerobic section 23 can be minimized even though the size of the separation wall 4A is like that shown in FIG. 1.

According to the present embodiment, in the circulation system by the air-lift pump 3 placed between the first denitrification tank 1 and the first nitrification tank 6, the semi-anaerobic section 23 is placed on a lower portion of the first nitrification tank 6. Anaerobic microorganisms are introduced into the aerobic section 24 through the semi-anaerobic section 23 in the first denitrification tank 1, wherein the anaerobic microorganisms has come to the first nitrification tank 6 together with the treatment water which has been treated by anaerobic microorganisms in the first denitrification tank 1. Consequently, in comparison with the case where the anaerobic microorganisms are directly introduced into the aerobic section 24, it is possible to more easily reduce the environmental stress on the anaerobic microorganisms coming from the first denitrification tank 1 to the first nitrification tank 6. This enhances the efficiency in treating nitrogen with microorganisms.

The microorganisms peculiar to the lower semi-anaerobic section 23 propagate in the first nitrification tank 6. Therefore, treatment water is microbially treated not only by anaerobic microorganisms and aerobic microorganisms but also by various microorganisms propagating in the semi-anaerobic section 23. As the result, the efficiency in waste water treatment is comprehensively enhanced. Moreover, it has been found out that providing the semi-anaerobic section 23 in the lower portion of the first nitrification tank 6 makes the microorganisms propagating in the semi-anaerobic section 23 help volume reduction of sludge. Aeration is not performed in the semi-anaerobic section 23 since aeration equipment is not provided there. However, the semi-anaerobic section 23 is influenced to some degree by the water flow from the aerated upper aerobic section 24, which therefore satisfies the semi-anaerobic condition that the dissolved oxygen level is more than 0 ppm up to about 0.5 ppm if any present. In this way, the semi-anaerobic state is maintained in the semi-anaerobic section 23.

The air-lift pump 3 has the longitudinal pipe 3A extending from the semi-anaerobic section 23 to the aerobic section 24 in the first nitrification tank 6. When air discharged from the diffusing pipe 5A ascends in the longitudinal pipe 3A, the return sludge is simultaneously transferred upward in the longitudinal pipe 3A from the semi-anaerobic section 23 of the first nitrification tank. The air-lift pump 3 secures only a relatively small pump head. However, the air-lift pump 3 transfers a large amount of return sludge to the first denitrification tank 1 by small electric power in comparison with squeeze pumps or the like. Thus, transferring a large amount of return sludge to the first denitrification tank 1 by the air-lift pump 3 makes it possible to use the return sludge for the purpose of agitation in the first denitrification tank 1.

In the aerobic section 24, the diffusing pipe 5B for airwashing the submerged membrane 7A is placed under the submerged membrane 7A. Air supply to the diffusing pipe 5B is implemented by using air discharged from the blower 16. Two types of membranes, a flat membrane and a hollow fiber membrane, are commercially available as the submerged membrane 7A. Either membrane may be adopted.

The treated water which has traveled through the submerged membrane 7A naturally flows out by gravity from a gravity pipe 9A connected to the submerged membrane 7A. In other words, the treated water comes out from the gravity pipe 9A by water head difference. Since the system using the water head difference requires no electric power, energy-saving operation becomes implementable. If the submerged membrane 7A is blocked to decrease the discharge amount from the gravity pipe 9A, then a submerged membrane pump 8A, which is connected by piping to the submerged membrane 7A, is operated so that treated water can be secured. As a system example of the utilizing the submerged membrane 7A, in view of the safety operation, it is preferable to concurrently adopt two types of systems i.e. the gravity pipe system and the submerged membrane pump system for securing treated water so as to make full use of the advantages of the respective systems. In the case where the amount of water filtrated by the submerged membrane 7A is decreased, that is, in the case where the amount of treated water is decreased, the submerged membrane 7A is cleaned with sodium hypochlorite or the like. The treatment water introduced from the first nitrification tank 6 through the gravity pipe 9A or the submerged membrane pump 8A becomes first treated water.

Description is given of malodor generated in the first waste water treatment apparatus 28. In the first denitrification tank 1 and the first nitrification tank 6 of the first waste water treatment apparatus 28, sulfur compounds are generated by decomposing dimethyl sulfoxide in treatment water. Malodorous gas 14 of the sulfur compounds is discharged from upper portions of the first denitrification tank 1 and the first nitrification tank 6. Accordingly, the first waste water treatment apparatus 28 has a cover section 28A, which entirely covers the waste water treatment apparatus 28 generating malodor. The malodorous gas 14 is introduced, through an exhaust pipe L1 connected to the cover section 28A, into a scrubber 11 by using an exhaust fan 10.

Microbial sludge for treating malodor is introduced into an upper section 11A of the scrubber 11 from a second nitrification tank 20 of the second waste water treatment apparatus 29, through outgoing pipes 12A, 12B for deodorization sludge. The microbial sludge, which is introduced into the upper section 11A of the scrubber 11 from the outgoing pipes 12A and 12B, flows down toward a lower portion 11B like spray. At that time, the malodorous gas is treated for deodorization by gas-liquid contact, specifically, by contact between the flowing-down microbial sludge and the malodorous gas which is introduced into the scrubber 11 by the exhaust fan 10. The malodorous gas is thus treated in the scrubber 11 and then discharged from the uppermost portion of the scrubber 11 as treated gas 15.

In the second waste water treatment apparatus 29, high concentration nitrogen waste water is introduced into a lower portion of a second denitrification tank 17. The high concentration nitrogen waste water includes high concentration ammonium waste water, waste developer and dimethylformamide waste liquid which have been produced in semiconductor plants. In the embodiment, the high concentration nitrogen waste water is introduced into the lower portion of the second denitrification tank 17, which portion is higher in microbial concentration than the upper portion thereof due to gravity. Therefore, a shock that the microorganisms receive is reduced, so that preferable microbial treatment is implemented.

The second denitrification tank 17 receives biologically treated water and/or sludge generated in biological treatment. The biologically treated water and/or the sludge generated in biological treatment contain micronutrients such as phosphorus, potassium, calcium and magnesium. Thus, the micronutrients promote the activity of all the microorganisms in each of the tanks. Since treatment water contains the micronutrients, the treatment can be stabilized particularly in the high concentration microbial treatment with use of a submerged membrane 7B placed in an upper aerobic section 26 of the second nitrification tank 20.

Moreover, an agitator 18 is placed in the second denitrification tank 17 for agitating the inside of the tank. A submerged agitator placed in water may be employed instead of a general agitator as the agitator 18 as long as anaerobic microorganisms are efficiently mixed with high concentration nitrogen waste water. However, the microbial concentration is as high as 10000 ppm in the second denitrification tank 17. Therefore, there might be a dead space in the second denitrification tank 17, that is, a portion which could not be agitated by the agitator 18. In order to solve this problem, an air-lift pump 19 is employed for circulated agitation.

The air-lift pump 19 introduces a large amount of return sludge containing microorganisms into the upper portion of the second denitrification tank 17 from a lower semi-anaerobic section 25 of the second nitrification tank 20. In the second waste water treatment apparatus 29 for treating malodor, a longitudinal pipe 19A of the air-lift pump 19 reaches a lower portion of the second nitrification tank 20. A diffusing pipe 5C is placed at the lower top end section of the longitudinal pipe 19A. Air generated from the blower 16 is discharged from the diffusing pipe 5C placed in the longitudinal pipe 19A. The ascending flow of air moves the return sludge containing microorganisms from the lower portion of the pipe to the upper portion of the pipe.

The high concentration nitrogen waste water introduced into the second denitrification tank 17 is anaerobically treated and thereafter introduced by gravity into the lower semi-anaerobic section 25 of the second nitrification tank 20 from the upper portion of the second denitrification tank 17. The submerged membrane 7B is placed in the upper aerobic section 26 of the second nitrification tank 20. Therefore, the microorganisms either stay in the second nitrification tank 20 or are returned to the second denitrification tank 17 by the air-lift pump 19. The return sludge is transferred by the air-lift pump 19 that utilizes air. In other words, the transfer system by using the air-lift pump 3 is an energy saving system. Generally, the pump system using mechanical driving force, such as a squeeze pump, can secure a large pump head but requires large power in comparison with the air-lift pump system, and therefore cannot fall into the energy-saving system.

The microbial sludge returned to the second denitrification tank 17 returns to the second nitrification tank 20 from the second denitrification tank 17 again for circulation. Circulating the microorganisms between both the tanks maintains the microbial concentration in both the tanks at generally the same level. As described above, circulated agitation by using the air-lift pump is a countermeasure against generation of the dead space due to high microbial concentration of 10000 ppm or more at which general agitators or submerged agitators cannot agitate. The microbial concentrations in both the tanks are maintained at 10000 ppm or more in MLSS (Mixed Liquor Suspended Solid). An oxidation-reduction potentiometer (unshown) is placed in the second denitrification tank 17 to measure the level of the anaerobiotic state.

In the second denitrification tank 17, nitrite nitrogen, which is introduced from the second nitrification tank 20 by the air-lift pump 19, is reduced up to nitrogen gas by anaerobic microorganisms. The nitrite nitrogen is produced in such a way that the high concentration nitrogen waste water is decomposed by microorganisms in the second nitrification tank 20. In the second denitrification tank 17, organisms in treatment water are biologically decomposed for treatment by anaerobic microorganisms.

Next, treatment water flowing from the second denitrification tank 17 is introduced into the lower semi-anaerobic section 25 of the second nitrification tank 20. As stated above, the anaerobic section is defined as a section in the state that no dissolved oxygen is present. The aerobic section is defined as a section in the state that a dissolved oxygen level is maintained at several ppm. The semi-anaerobic section is defined as a section in the state that the dissolved oxygen level is more than 0 ppm up to about 0.5 ppm if any present.

The second nitrification tank 20 has a separation wall 4B placed on the inner side surface of the second nitrification tank 20 for separating the upper aerobic section 26 and the lower semi-anaerobic section 25. The separation wall 4B may be constructed with concrete or made of steel. Although the separation wall 4B may be made from any material, in the case of steel, sufficient coating is necessary for preventing corrosion for a long period of time.

A water flow is generated in the upper aerobic section 26 of the second nitrification tank 20 by air discharged from a diffusing pipe 5D. Due to the separation wall 4B, however, the water flow has some but not so much influence upon the lower semi-anaerobic section 25. Since the microbial concentration is high in the first nitrification tank 6, the water flow influence of the aerobic section 26 upon the semi-anaerobic section 25 can be minimized even though the size of the separation wall 4B is like that shown in FIG. 1.

Thus, According to the present embodiment, in the circulation system by the air-lift pump 19 placed between the second denitrification tank 17 and the second nitrification tank 20, the semi-anaerobic section 25 is placed in a lower portion of the second nitrification tank 20. Thereby, anaerobic microorganisms are introduced into the aerobic section 26 through the semi-anaerobic section 25, wherein the anaerobic microorganisms has come to the second nitrification tank 20 together with the treatment water which has been treated by anaerobic microorganisms in the second denitrification tank 17. Consequently, in comparison with the case where the anaerobic microorganisms are directly introduced into the aerobic section 26, it is possible to more easily reduce the environmental stress on the anaerobic microorganisms. This enhances the comprehensive efficiency in treating nitrogen with microorganisms.

It has been found out that the semi-anaerobic section 25 in the lower portion of the second nitrification tank 20 makes the microorganisms propagating in the semi-anaerobic section 25 help volume reduction of sludge. Aeration is not performed in the semi-anaerobic section 25 since aeration equipment is not provided there. However, the semi-anaerobic section 25 is influenced to some degree by the water flow from the aerated upper aerobic section 26, which therefore satisfies the semi-anaerobic condition that the dissolved oxygen level is more than 0 ppm up to about 0.5 ppm if any present. In this way, the semi-anaerobic state is maintained in the semi-anaerobic section 25.

Moreover, the air-lift pump 19 has the longitudinal pipe 19A extending from the semi-anaerobic section 25 to the aerobic section 26 in the second nitrification tank 20. In the air-lift pump 19, when air discharged from the blower 16 ascends in the longitudinal pipe 19A, the return sludge is simultaneously transferred upward in the longitudinal pipe 19A. Although the air-lift pump 19 secures only a relatively small pump head, the air-lift pump 19 transfers a large amount of return sludge to the second denitrification tank 17 by small electric power in comparison with squeeze pumps or the like.

Thus, according to the air-lift pump 19, a large amount of return sludge can be transferred to the second denitrification tank 17. This is useful for agitation in the first denitrification tank 1.

In the aerobic section 26 of the second nitrification tank 20, the diffusing pipe 5D for air-washing the submerged membrane 7B is placed under the submerged membrane 7B. Air supply to the diffusing pipe 5D is implemented by using air discharged from the blower 16. Either of two types of commercially available membranes, a flat membrane or a hollow fiber membrane, may be adopted as the submerged membrane 7B.

The treated water in the second nitrification tank 20 naturally flows out, as second treated water, by gravity from a gravity pipe 9B connected to the submerged membrane 7B. In other words, the second treated water from the gravity pipe 9B is guided out by water head difference. Since the system using gravity requires no electric power, energy-saving operation becomes implementable. If the submerged membrane 7B is blocked to decrease the discharge amount from the gravity pipe 9B, then a submerged membrane pump 8B, which is connected by piping to the submerged membrane 7B, is operated so that treated water can be secured.

For a system of utilizing the submerged membrane 7B, in view of the safety operation, it is preferable to concurrently adopt two types of gravity pipe system and submerged membrane pump system for securing second treated water so as to make full use of the respective systems. In the case where the filtrated water amount by the submerged membrane 7B is decreased, that is to say, in the case where the treated water amount is decreased, the submerged membrane 7B is cleaned with sodium hypochlorite or the like.

In this way, the treatment water from the second nitrification tank 20 is guided out through the upper section 9 and/or the submerged membrane pump 8B as the second treated water.

Description is given of malodor treatment conducted in the waste water treatment apparatus 29. The microbial sludge adsorbs causative substances of malodor such as sulfur compounds, wherein the microbial sludge is contained in the upper aerobic section 26 of the second nitrification tank 20 provided in the waste water treatment apparatus 29. After adsorbing the causative substances, they are partially decomposed by microorganisms. Specifically, the microbial sludge in the aerobic section 26, as deodorization sludge, is introduced into the upper section 11A of the scrubber 11 through the outgoing pipes 12A, 12B by a sludge pump 22. As the result, the malodor introduced from the waste water treatment apparatus 28 is adsorbed by the microbial sludge and partially decomposed and treated by the microorganisms. More specifically, the microbial sludge is sprinkled from the upper section 11A of the scrubber 11 like spray to bring the microbial sludge into contact with the malodorous gas so that malodorous components such as sulfur compounds can be adsorbed and partially decomposed by microorganisms. More specifically, the microbial sludge is sprinkled like spray from the upper section 11A of the scrubber 11 so as to mix with the malodorous gas. Thereby, the malodorous sulfur components are absorbed into the microbial sludge and partially decomposed. The sludge, which has partially decomposed the malodorous components by adsorption thereof with use of microorganisms, is transferred through an incoming pipe 13 for deodorization sludge, which pipe is connected to a lower portion 11B of the scrubber 11. The sludge is then introduced into the upper portion of an introduction pipe 21 for sludge containing malodor. The introduction pipe 21 extends from the upper portion to the lower portion of the second nitrification tank 20 in the vertical direction.

Therefore, the sludge containing the malodorous components moves from the upper portion to a lower portion of the introduction pipe 21. Then, the sludge is introduced into the semi-anaerobic section 25, where the major part of the causative substances of malodor is decomposed and treated by microorganisms. The microbial sludge after decomposing the causative substances of malodor moves again to the aerobic section 26. Thereafter, the microbial sludge is introduced from the aerobic section 26 to the upper section 11A of the scrubber 11 by the sludge pump 22 via the outgoing pipe 12 for deodorization sludge. In other words, the microbial sludge in the second nitrification tank 20 of the waste water treatment apparatus 29 circulates among the aerobic section 26, the semi-anaerobic section 25 in the second nitrification tank 20 and the scrubber 11 via the pipes 12A, 12B and the incoming pipe 13 for deodorization sludge. Thus, the deodorization sludge, through the circulation thereof, decomposes and treats malodorous compounds such as sulfur contained in the malodorous gas generated in the waste water treatment apparatus 28, wherein the first partial decomposition is performed in the scrubber 11, and the second main decomposition is performed by the microorganisms in the semi-anaerobic section 25 and the aerobic section 26.

Second Embodiment

Figure 2:
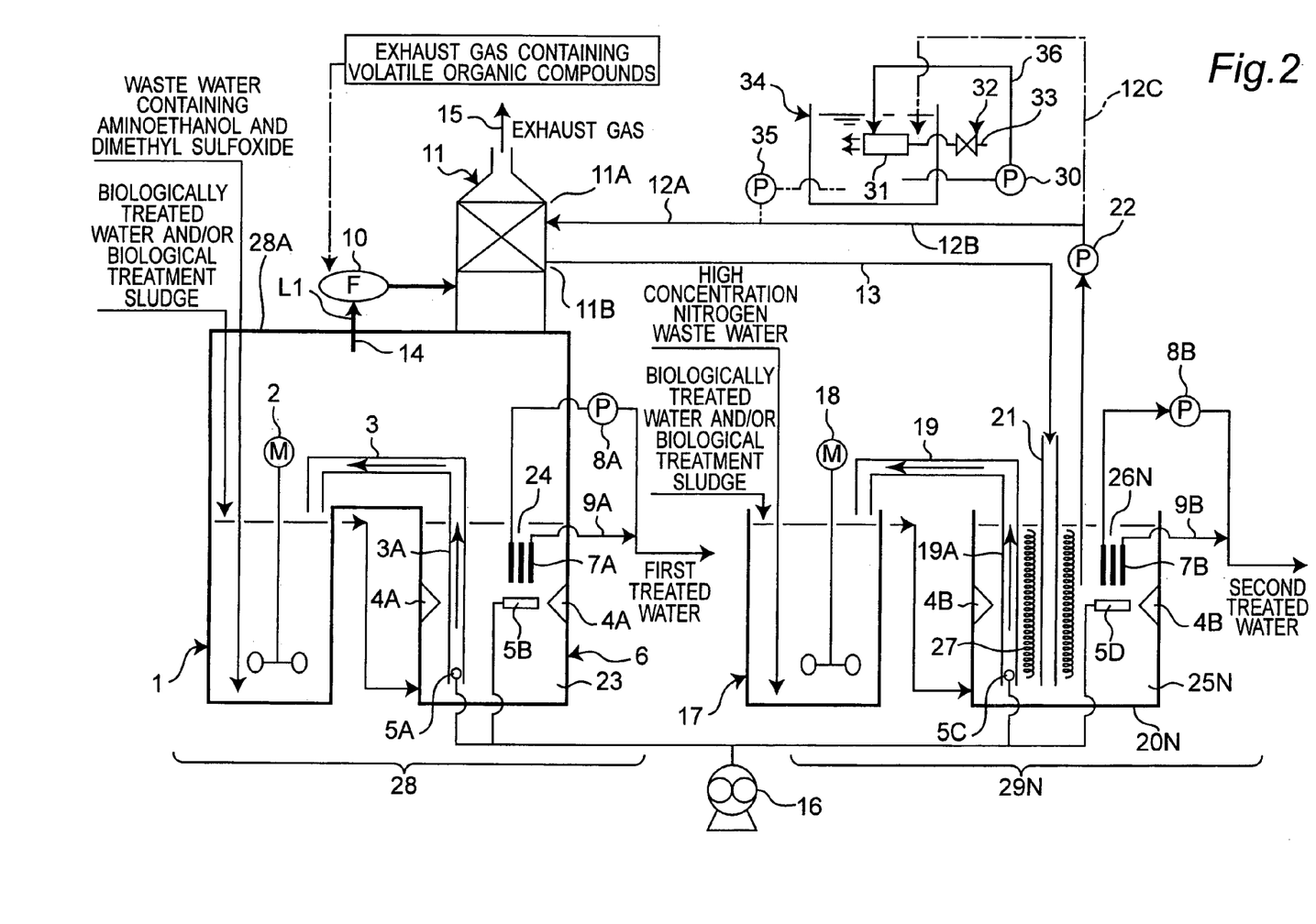
FIG. 2 is a schematic view of a waste water treatment apparatus according to a second embodiment of the present invention and modification thereof.

FIG. 2 shows a waste water treatment apparatus according to a second embodiment of the present invention. In the first embodiment as shown in FIG. 1, the aerobic section 26 and the semi-anaerobic section 25 in the second nitrification tank 20 are not filled with a filler material. In the second embodiment, on the other hand, an aerobic section 26N and a semi-anaerobic section 25N in a second nitrification tank 20N are filled with a polyvinylidene chloride filler material 27. In the second embodiment, therefore, the component members identical to those in the first embodiment are designated by identical reference numerals, and their detailed description is omitted. Parts different from the first embodiment will mainly be described.

In the second embodiment, it is possible to increase efficiency in nitrogen treatment for high concentration nitrogen waste water, and also to efficiently decompose the major part of the malodorous compounds such as sulfur. This is because the aerobic section 26N and the semi-anaerobic section 25N of the second nitrification tank 20N are filled with the polyvinylidene chloride filler material 27 in a waste water treatment apparatus 29N as a second waste water treatment section.

In other words, the microbial concentration in the aerobic section 26N and the semi-anaerobic section 25N is higher than the microbial concentration without any filler material on an average of the entire tank, because the aerobic section 26N and the semi-anaerobic section 25N in the second nitrification tank 20N are filled with the polyvinylidene chloride filler material 27. Further, the microorganisms are more stabilized than in the case of no filler material. This enhances the capability to treat nitrogen and malodorous components. This is because microorganisms are attached onto the polyvinylidene chloride filler material 27 and propagate thereon. It is desirable to place the polyvinylidene chloride filler material 27 in the entire second nitrification tank 20N since the microbial concentration is increased across the entire tank.

In the waste water treatment apparatus 29N of the second embodiment, microorganisms propagate on the polyvinylidene chloride filler material 27 as time advances starting from a test run. The microbial concentration on the surface of the polyvinylidene chloride filler material 27 reaches 30000 ppm or more. This contributes to increase in treatment efficiency of nitrogen and malodorous components. The polyvinylidene chloride filler material 27 is solid and resistant to chemical substances, so that the polyvinylidene chloride filler material 27 can be semipermanently used. Products such as Bio-Code, Ling-Lace, Bio-Multi-Leaf and Bio-Module are available as the polyvinylidene chloride filler material 27. Selection from among the products depends on the properties of waste water. In the aerobic section 26N of the second nitrification tank 20N, ammonium nitrogen in the treatment water is oxidatively decomposed by aerobic microorganisms, so that ammonium nitrogen changes into nitrate nitrogen and/or nitrite nitrogen.

Third Embodiment

Figure 3:
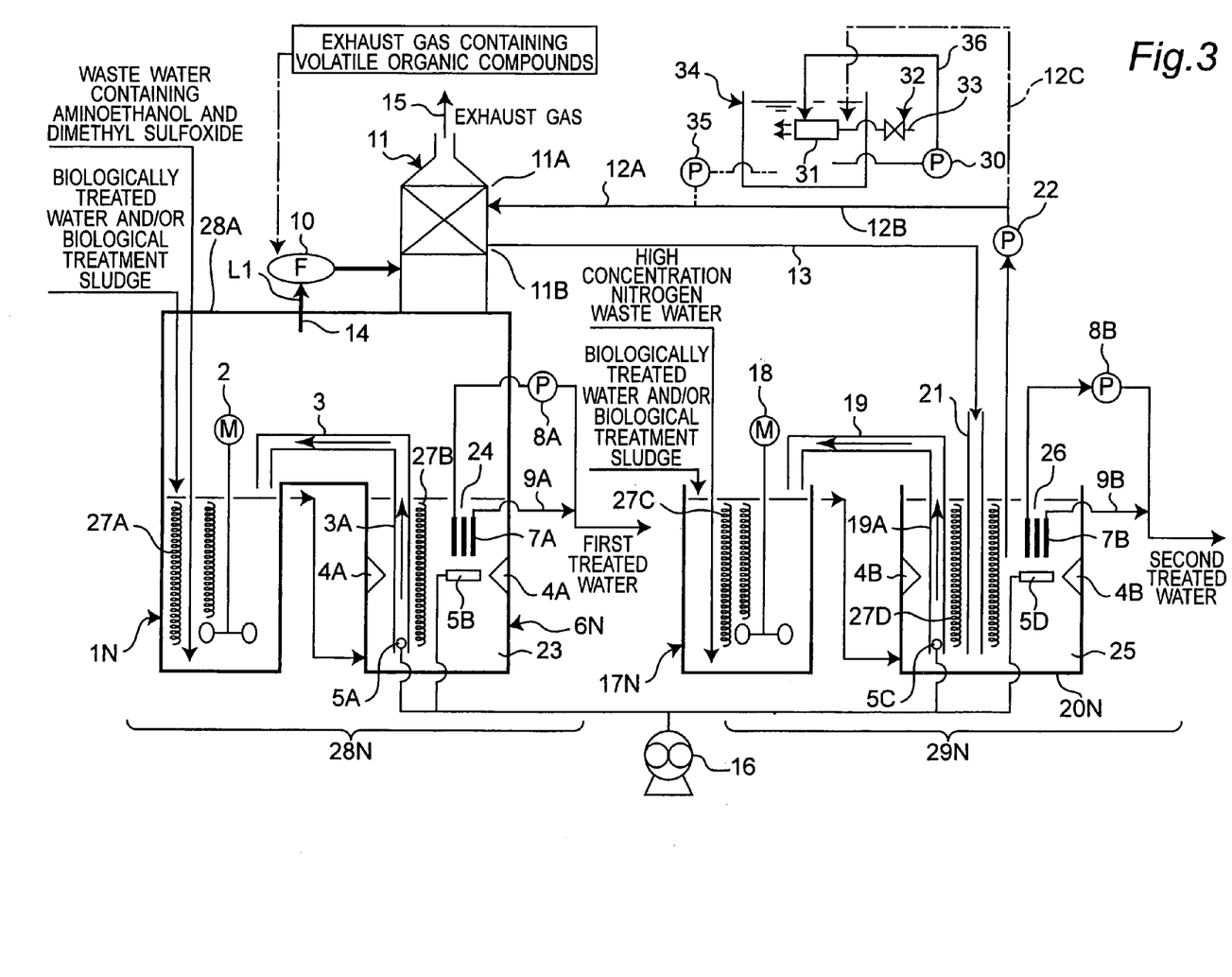
FIG. 3 is a schematic view of a waste water treatment apparatus according to a third embodiment of the present invention and modification thereof.

FIG. 3 shows a waste water treatment apparatus according to a third embodiment of the present invention. In the first embodiment shown in FIG. 1, the first denitrification tank 1 and the first nitrification tank 6 in the waste water treatment apparatus 28 as well as the second denitrification tank 17 and the second nitrification tank 20 in the waste water treatment apparatus 29 are not filled with a filler material. In the third embodiment, on the other hand, a first denitrification tank 1N and a first nitrification tank 6N in a waste water treatment apparatus 28N are filled with polyvinylidene chloride filler materials 27A, 27B. In the third embodiment, a second denitrification tank 17N and a second nitrification tank 20N in a waste water treatment apparatus 29N are filled with polyvinylidene chloride filler materials 27C, 27D. Accordingly, in the third embodiment, the component members identical to those in the first embodiment are designated by identical reference numerals, and their detailed description is omitted. Parts different from the first embodiment will mainly be described.

In the third embodiment, the first denitrification tank 1N and the first nitrification tank 6N of the waste water treatment apparatus 28N are filled with polyvinylidene chloride filler materials 27A, 27B, which increase the efficiency in decomposition and nitrogen treatment of aminoethanol and dimethyl sulfoxide in the waste water containing aminoethanol and dimethyl sulfoxide. Also, in the third embodiment, the second denitrification tank 17N and the second nitrification tank 20N of the waste water treatment apparatus 29N are filled with the polyvinylidene chloride filler materials 27C, 27D, which increase the efficiency of nitrogen treatment in high concentration nitrogen waste water.

In other words, the first denitrification tank 1N, the first nitrification tank 6N, the second denitrification tank 17N and the second nitrification tank 20N are all filled with the polyvinylidene chloride filler materials 27A, 27B, 27C, 27D, so that the microbial concentration in the respective tanks becomes higher than that in the case of no filler material on an average of the entire tanks. In addition, microorganisms are attached onto the polyvinylidene chloride filler materials 27A to 27D and propagate thereon. As the result, the microorganisms are more stabilized than in the case of no filler material, and therefore the capability to decompose aminoethanol, dimethyl sulfoxide and nitrogen and to treat nitrogen is enhanced. In order to achieve high microbial concentration in each of the tanks, it is desirable to place the polyvinylidene chloride filler materials 27A to 27D in each of the entire tank. The presence of the polyvinylidene chloride filler materials 27A to 27D increases the anaerobic level (measured by oxidation-reduction potential) in comparison with the state without any filler materials, so that the denitrifying reaction can be promoted. In the waste water treatment apparatus according to the present embodiment, the microorganisms propagate on the polyvinylidene chloride filler materials 27A to 27D as time advances starting from a test run. The microbial concentration on the surface of the polyvinylidene chloride filler materials 27A to 27D reaches 30000 ppm or more, which enhances the capability to decompose aminoethanol, dimethyl sulfoxide and nitrogen and to treat nitrogen.

The polyvinylidene chloride filler materials 27A to 27D are made of polyvinylidene chloride, which is solid and resistant to chemical substances and can be used on the semipermanent basis. As the polyvinylidene chloride filler materials 27A to 27D, products such as Bio-Code, Ling-Lace, Bio-Multi-Leaf and Bio-Module are available. Selection from among the products depends on the properties of waste water.

The treatment water is returned to the first denitrification tank 1N and the second denitrification tank 17N from the first nitrification tank 6N and the second nitrification tank 20N by the air-lift pump 3 and the air-lift pump 19, respectively. In the first denitrification tank 1N and the second denitrification tank 17N, nitrite nitrogen in the treatment water is reduced to nitrogen gas for nitrogen treatment. In the first nitrification tank 6N and the second nitrification tank 20N, aminoethanol and ammonium nitrogen in the treatment water are oxidatively decomposed by aerobic microorganisms and changed into nitrate nitrogen and/or nitrite nitrogen.

In the first to third embodiments, descriptions have been given of the case where the malodorous gas 14 from the first waste water treatment apparatus 28 is introduced into the scrubber 11 by the exhaust fan 10. In the first to third embodiments, however, no exhaust gas containing volatile organic compounds from the first waste water treatment apparatus 28 is introduced into the scrubber 11. It is acceptable that not only the malodorous gas 14 generated in the first waste water treatment apparatus 28 but also the gas containing volatile organic compounds are introduced into the scrubber 11 by the exhaust fan 10. This case constitutes a modification to the first to third embodiments. In this modification, both the gases are reasonably treated by microorganisms in the scrubber 11. The gas treatment using microorganisms can be widely applied to the various types of gases. That is, a wide variety of gasses can be treated in the scrubber 11. In some case, the gas containing volatile organic compounds includes malodorous gas.

In the first to third embodiments, descriptions have been given of the case where the pipes 12A, 12B for deodorization sludge are provided for introducing the microbial sludge in the aerobic section 26 to the scrubber 11. In the first to third embodiments, however, an outgoing pipe 12C for deodorization sludge is not provided. In a modification of the first to third embodiments, as shown by a chain line in FIGS. 1 to 3, the outgoing pipe 12C for deodorization sludge is provided in place of the pipe 12B, wherein a micro-nano bubble generation tank 34 is also provided. In this modification, therefore, the microbial sludge, which comes from the second nitrification tank 20 of the waste water treatment apparatus 29 for treating malodor, is introduced into the micro-nano bubble generation tank 34 through the outgoing pipe 12C for deodorization sludge by the sludge pump 22.

A micro-nano bubble generator 31 is placed in the micro-nano bubble generation tank 34. Air is introduced into the micro-nano bubble generator 31 from an air suction pipe 33, wherein air is adjusted by a valve 32. The sludge in the micro-nano bubble generation tank 34 is supplied to the micro-nano bubble generator 31 from a water supply pipe 36 by a circulating pump 30 at the pressure of 1.5 kg/cm² or more. Since the sludge mostly consists of water, the micro-nano bubble generator 31 efficiently generates micro-nano bubbles. Consequently, in the micro-nano bubble generation tank 34, the sludge and the micro-nano bubbles are mixed to activate the microorganisms in the sludge.

The microbial sludge, which contains the micro-nano bubbles generated in the micro-nano bubble generation tank 34, is sprinkled in the upper section 11A of the scrubber 11 by a micro-nano bubble generation tank pump 35 through the outgoing pipe 12A for deodorization sludge. In the scrubber 11, the microbial sludge containing the micro-nano bubbles is sprinkled from the upper section 11A to bring the microbial sludge into contact with malodorous gas and gas containing volatile organic compounds. Thereby, the microbial sludge absorbs malodorous components such as sulfur compounds and volatile organic compounds, so that these components are partially decomposed by microorganisms. The microorganisms in the microbial sludge are activated by micro-nano bubbles, and therefore the efficiency of gas treatment in the scrubber 11 is enhanced.

The sludge, which has partially decomposed the malodorous components and volatile organic compounds by adsorption thereof with use of microorganisms in the scrubber 11, is introduced into the upper portion of an introduction pipe 21 for sludge containing malodor through an incoming pipe 13 for deodorization sludge. The incoming pipe 13 is connected to the lower portion 11B of the scrubber 11. The introduction pipe 21 extends from the upper portion to the lower portion of the second nitrification tank 20 in the vertical direction.

The sludge, which contains the malodorous components and the volatile organic compounds, is moved from the upper portion of the introduction pipe 21 to a lower portion of the introduction pipe 21. Thereafter, the sludge is introduced into the semi-anaerobic section 25, where the major parts of the causative substances of malodor and the volatile organic substances are decomposed by microorganisms. After decomposing the causative substances of malodor and the volatile organic compounds, the microbial sludge is moved again to the aerobic section 26. The microbial sludge is then introduced from the aerobic section 26 into the upper section 11A of the scrubber 11 by the sludge pump 22, via the outgoing pip 12C for deodorization sludge and the micro-nano bubble generation tank 34. In other words, in the waste water treatment apparatus 29, the microbial sludge in the second nitrification tank 20 circulates among the aerobic section 26 and the semi-anaerobic section 25 of the second nitrification tank 20, and the scrubber 11 through the pipes 12A, 12C for deodorization sludge, the micro-nano bubble generation tank 34 and the incoming pipe 13. By the circulation of deodorization sludge, the sludge for deodorization adsorbs malodorous compounds such as sulfur contained in the malodorous gas and volatile organic compounds contained in the volatile organic compounds generated in the waste water treatment apparatus 28. Thus, both the malodorous compounds and the volatile organic compounds are treated through the first partial decomposition in the scrubber 11, and through the second main decomposition performed by the microorganisms, which are activated by the sludge containing micro-nano bubbles, in the semi-anaerobic section 25 and the aerobic section 26.

In modification to the above, for example, isopropyl alcohol, acetone and butyl acetate are included in the volatile organic compounds in the exhaust gas containing volatile organic compounds. Naturally, any one of those referred to as VOCs (volatile organic compounds) is included there.

EXPERIMENTAL EXAMPLE

An experimental apparatus having a configuration identical to that in the second embodiment shown in FIG. 2 was made. In the experimental apparatus, the first denitrification tank 1 had a capacity of 100 liters, the first nitrification tank 6 had a capacity of 200 liters, the second denitrification tank 17 had a capacity of 100 liters and the second nitrification tank 20N had a capacity of 200 liters.

Treatment water having an aminoethanol concentration of 2760 ppm and a dimethyl sulfoxide concentration of 130 ppm was collected as waste water containing aminoethanol and dimethyl sulfoxide discharged from production equipment in plant. After microorganisms had been cultured for two months in the experimental apparatus so as to reach a microbial concentration of 17700 ppm, the treatment water was continuously introduced into the first denitrification tank 1. After a lapse of one month for stabilization of the water quality, the aminoethanol concentration measured was 120 ppm in the first treated water, while the dimethyl sulfoxide concentration was 8 ppm. Malodorous gas (which has an odor level in which a person can sense odor when coming within one meter from the experimental apparatus) was generated from the malodor-generating waste water treatment apparatus 28 (first denitrification tank 1 and first nitrification tank 6), and the malodorous gas was treated in the scrubber 11. Exhaust gas 15 after treatment of the malodorous gas was hardly malodor-detectable.

Figure 4A:
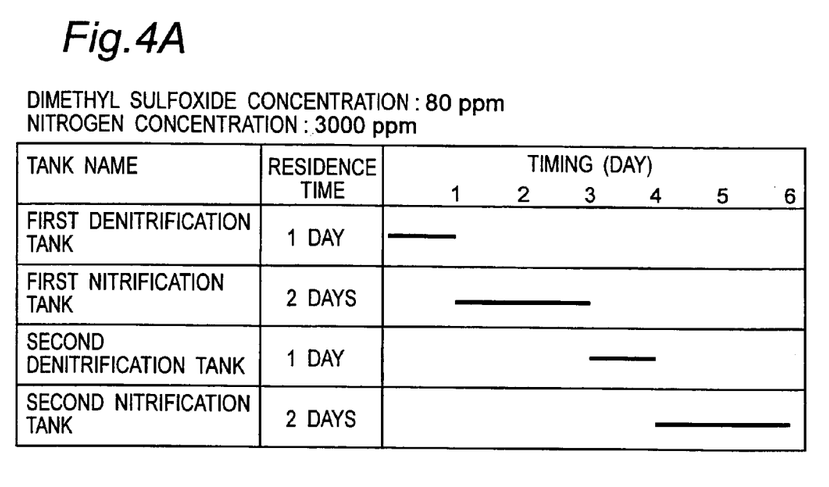
FIG. 4A is a time chart of respective tanks according to the first to third embodiments in the case where a dimethyl sulfoxide concentration is approximately 80 ppm and a nitrogen concentration is approximately 3000 ppm.
Figure 4B:
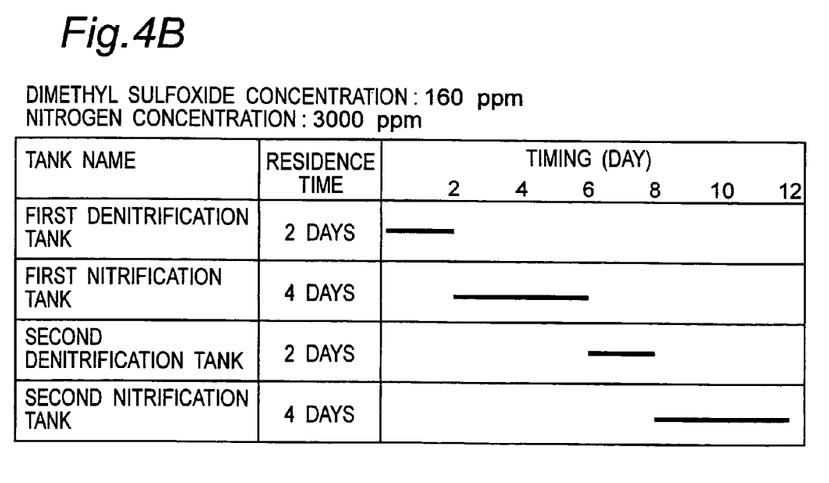
FIG. 4B is a time chart of respective tanks according to the first to third embodiments in the case where a dimethyl sulfoxide concentration is approximately 160 ppm and a nitrogen concentration is approximately 3000 ppm.

FIG. 4A is a time chart showing a residence time of the treatment water in each tank in the first to third embodiments in the case where the waste water introduced into the first denitrification tank has a dimethyl sulfoxide concentration of approximately 80 ppm and the waste water introduced into the second denitrification tank has a nitrogen concentration of approximately 3000 ppm. FIG. 4B is another time chart showing a residence time of the treatment water in each tank in the first to third embodiments in the case where the waste water introduced into the first denitrification tank has a dimethyl sulfoxide concentration of approximately 160 ppm and the waste water introduced into the second denitrification tank has a nitrogen concentration of approximately 3000 ppm.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. A waste water treatment apparatus, comprising:
a contact section for receiving malodorous gas and sludge and bringing the malodorous gas and the sludge into contact with each other; and
a high concentration microbial tank for receiving the sludge which had been brought into contact with the malodorous gas and treatment water and having a microbial concentration of 10000 ppm or more, wherein
the high concentration microbial tank has a polyvinylidene chloride filler material.

2. The waste water treatment apparatus as set forth in claim 1, wherein
the contact section is a scrubber.

3. The waste water treatment apparatus as set forth in claim 1, wherein
the high concentration microbial tank has a submerged membrane.

4. The waste water treatment apparatus as set forth in claim 1, wherein
the high concentration microbial tank has a lower semi-anaerobic section and an upper aerobic section.

5. The waste water treatment apparatus as set forth in claim 1, further comprising:
a denitrification and nitrification section for denitrifying and nitrifying nitrogen waste water, wherein
the high concentration microbial tank is a nitrification tank included in the denitrification and nitrification section.

6. The waste water treatment apparatus as set forth in claim 5, wherein
the denitrification and nitrification section has:
a denitrification tank;
the nitrification tank; and
an air-lift pump for circulating treatment water from the nitrification tank to the denitrification tank.

7. The waste water treatment apparatus as set forth in claim 6, wherein
treated water which has biologically been treated and/or sludge generated during biological treatment are introduced into the denitrification and nitrification section.

8. The waste water treatment apparatus as set forth in claim 1, wherein
the malodorous gas contains volatile organic compounds.

9. The waste water treatment apparatus as set forth in claim 8, wherein
the volatile organic compounds contained in the malodorous gas contain at least one of isopropyl alcohol, acetone and butyl acetate.

10. The waste water treatment apparatus as set forth in claim 1, wherein
the sludge contains micro-nano bubbles.

11. A waste water treatment apparatus, comprising:
a first waste water treatment section for performing first waste water treatment and generating malodorous gas; and
a second waste water treatment section for performing second waste water treatment and decomposing and treating the malodorous gas generated by the first waste water treatment section,
the first waste water treatment section having:
a first denitrification tank for receiving waste water containing aminoethanol and dimethyl sulfoxide; and
a first nitrification tank having a semi-anaerobic section, and
the second waste water treatment section having:
a second denitrification tank for receiving nitrogen waste water;
a second nitrification tank having a semi-anaerobic section;
a scrubber for receiving malodorous gas from the first waste water treatment section;
a first sludge introduction section for introducing sludge from the second nitrification tank into the scrubber; and
a second sludge introduction section for introducing the sludge from the scrubber into the second nitrification tank.

* * * * *